April 9, 1940.                 J. KAHN ET AL                    2,196,454
PIPE THREAD PROTECTOR
Filed Dec. 10, 1938
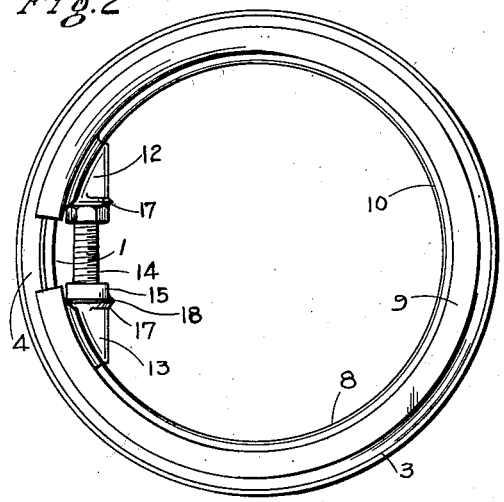
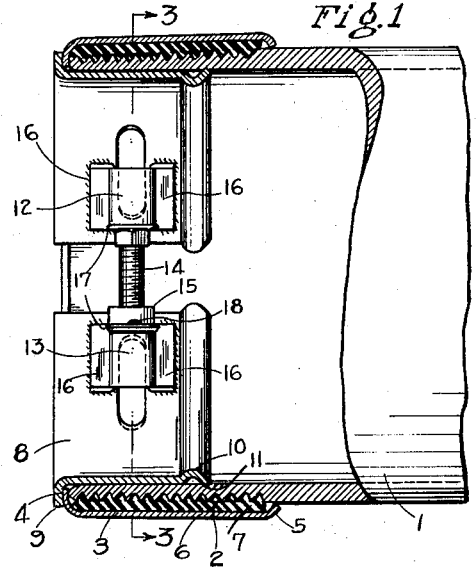
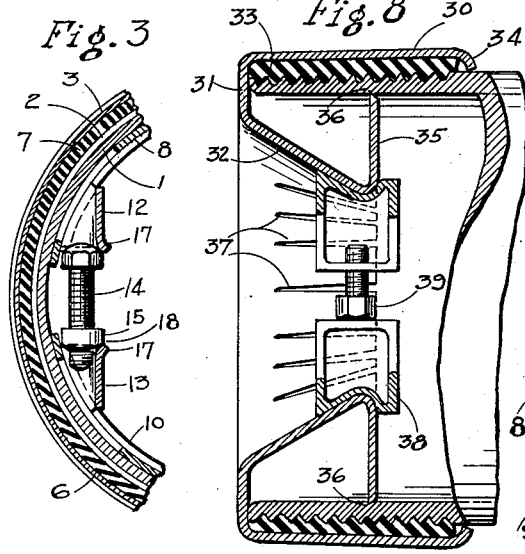
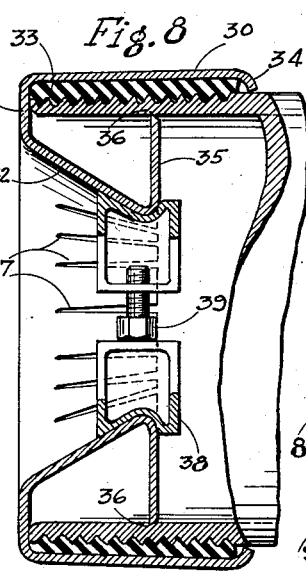
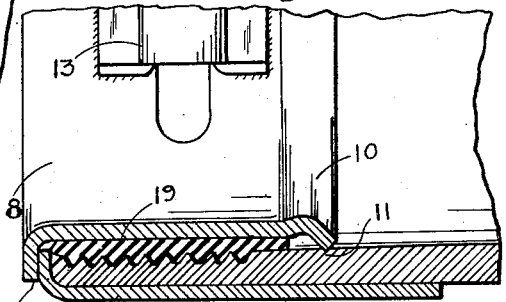
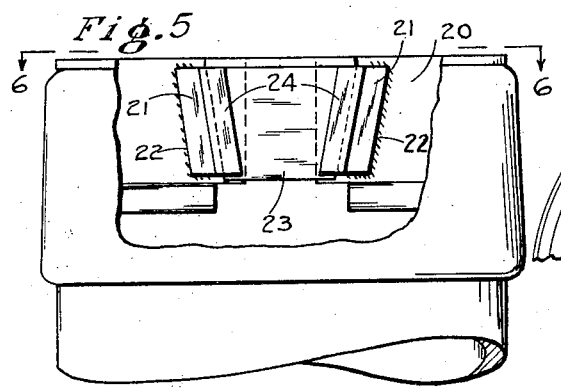
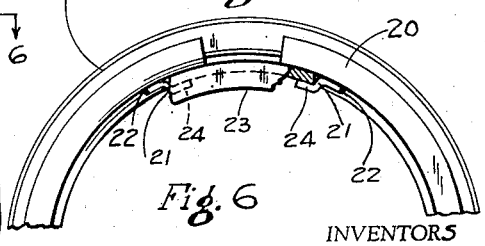
INVENTORS
Julius Kahn
Walter F. Schulz
Cecil Schofield.
BY Richey Watts
ATTORNEYS Patented Apr. 9, 1940

2,196,454

UNITED STATES PATENT OFFICE 2,196,454

PIPE THREAD PROTECTOR

Julius Kahn, Cleveland Heights, Walter F. Schulz, Shaker Heights, and Cecil Schofield, Lakewood, Ohio, assignors to Republic Steel Corporation, Cleveland, Ohio, a corporation of New Jersey Application December 10, 1938, Serial No. 245,010

4 Claims. (Cl. 138—96)

This invention relates to the art of protecting threads on pipe, and is particularly concerned with new and improved means for protecting threads on the ends of large diameter, heavy metal pipe which is subjected to severe usage in handling.

Steel pipe is used extensively for many industrial purposes. It is made from metal of various thicknesses and in various diameters and lengths. One example of such extensively used pipe is casing for oil wells. There, for example, the pipe may range in diameter from about 7" to 16" or more, may have a wall thickness ranging from .272" to .50" or more, and a length up to 40 feet or more, and may weigh from a few to many hundreds of pounds.

Threaded steel pipe is made for many industrial purposes in various sizes. For example, it is made in sizes having an outside diameter of 2⅜", a wall thickness of .154", a weight of 3.6 pounds per lineal foot, and in lengths up to about 40 feet. It is also made in sizes having an outside diameter of 16", a wall thickness of .50", a weight of 82.77 lbs. per lineal foot, and in lengths up to 40 feet. It is also made in various sizes and weights between these two illustrations.

When such large pipe is provided with threads at the ends, a real problem arises in adequately protecting the threads during handling of the pipe. Such pipe is ordinarily threaded at the steel plant where it is made and is then shipped partly by rail and partly by truck to the place of installation. Several handling operations are thus required after the pipe has been threaded. Sometimes the threaded pipe is handled by being dragged with one end in contact with the ground, or the floor of a building, truck or car, and at such times the pipe may come forcibly into contact with hard objects. It is also repeatedly subjected to sharp impacts, as by being dropped or by heavy objects being dropped on it, which impacts may distort the threaded ends or damage the threads.

The problem of adequately protecting the threads, whether they be inside of or outside of the pipe ends, is a serious problem for if the threads are damaged or the threaded ends are bent, they do not fit the couplings and ordinarily there is no equipment available at the place of installation of the pipe to restore the pipe to its proper shape or the threads to a suitable condition, and the damaged piece of pipe cannot be used in the field but must be returned to the steel plant for salvaging. This problem is of long standing duration, and many efforts have been made to solve it. So far as we know, however, none of the various attempts to solve the problem have been entirely successful.

The present invention provides a simple and yet highly effective protector for threads at the ends of large, heavy metal pipe, and avoids the shortcomings and disadvantages of prior proposed expedients.

The drawing accompanying and forming a part of this specification shows embodiments of the present invention.

Figure 1 is a longitudinal, fragmentary, sectional view of a device embodying the present invention for a large diameter pipe.

Figure 2 is an end elevation of the device of Fig. 1.

Figure 3 is a fragmentary, cross-sectional view taken on line 3—3 of Fig. 1, showing details of the expanding means.

Figure 4 shows a modified form of the invention for protecting inside threads.

Figure 5 is a longitudinal, fragmentary, sectional view showing an inner shell and modified expanding means embodying the present invention.

Figure 6 is an end view of the locking device of Fig. 5.

Figure 7 is a fragmentary view of a modification of the shell retaining edge of Fig. 1.

Figure 8 is a fragmentary, partly sectional view of another device embodying the present invention.

Referring first to Figs. 1, 2 and 3, I designates the end portion of a large diameter, heavy, steel pipe provided with outside threads 2 extending back some distance from the end thereof. It will be noted that the outside diameter of the threaded portion of the pipe I tapers slightly from the end to the unthreaded portion.

The outer shell 3 is a continuous annulus with an inturned flange 4 at its outer end to cover and lie against the end surface of the pipe wall, has an inwardly bent inner end 5 with an inside diameter sufficient to pass over the threaded portion of the pipe and to lie close to, and more or less substantially to engage, the unthreaded portion thereof, and has a cylindrical portion 6 between the ends 4 and 5, which is tapered in approximate conformity to the threaded part of the pipe and is spaced radially away from the threads 2 to provide a space in which a suitable filler 7 may be positioned. Preferably, the filler should be capable of absorbing shocks, so that impact blows delivered against the shell 3 will be cushioned or more or less completely absorbed thereby and the threads protected against damage in this way. Rubber material cemented to the shell is illustrative of a satisfactory filling for this purpose.

The inner shell 8 is a longitudinally split annulus. It has an outturned flange 9 at its outer end which is shaped to bear against the outer surface of flange 4 when the two shells are used as shown in Figs. 1 and 2, and has an inturned inner end 10 so shaped that the outer edge 11 thereof may come into contact thruout substantially its entire length with the inner surface of the pipe. The shell 8, as shown in Figs. 1 and 2 is substantially cylindrical between the ends 9 and 10, but is preferably of slightly less diameter than the diameter of edge 11.

The inner shell 8 may be expanded by means including brackets 12 and 13 secured to the ends thereof and by bolt 14, the head of which bears against bracket 12 and is threaded thru nut 15 attached to bracket 13. As is shown in Figs. 1 and 3, brackets 12 are generally U-shaped with side flanges 16 which can be secured to the inner surface of the shell 8 in any suitable manner, for example, by welding, and the brackets have flared opposed ends 17 to seat the chamfered ends of the bolt 14 and nut 15 to provide for the slight shifting movement which takes place between the brackets and the bolt and nut during expanding or contracting movements of the shell 8. Preferably the nut 15 is spot welded to its bracket at one or two points, as indicated at 18, to retain the nut and bolt in position in bracket 13 at all times.

The device of Figs. 1, 2 and 3 may be applied to the end of a pipe having outside threads as follows: The outer shell 3 is provided with the desired thickness of a suitable filler lying between the outer and inner ends 4 and 5. Such shell is then telescoped over the end of the pipe until the flange 4 engages the end surface thereof. Then the contracted inner shell 8 is telescoped within the pipe until the flange 9 rests against the outer surface of flange 4, and the bolt 14 is turned to expand the shell 8 and to force the sharp edge 11 into intimate contact or biting engagement with the inner surface of the pipe. This edge 11 may be hardened if desired, so as actually to amount to a cutting edge, which may form a slight depression in the inner surface of the pipe, thereby seating itself and affording a lock which will effectually prevent dislodgment of either shell during rough handling operations.

It will be noted that the protector of Figs. 1, 2 and 3 is free from exterior projections which would catch on any rough surface by which the projector might be pulled off the pipe, as for example, when one end of the pipe was being dragged along a floor or the ground. The inturned end 5 of the outer shell provides a smooth surface to ride over obstructions and also prevents ingress of dirt into the thread space. The outer flange 9 of the inner shell does not extend beyond the circumference of the outer shell and hence would not engage an obstruction to the extent necessary for the dislodgment of the shell 8, particularly where the edge 11 thereof was imbedded in the inner surface of the pipe.

Fig. 4 shows means embodying this invention for protecting inside pipe threads. It will be understood that the outer shell 3 may be omitted, if desired. In that event, the flange 9 of the inner shell 8 should not extend beyond the outer surface of the pipe. The cylindrical portion of sleeve 8 between flange 9 and edge 11 is made with a smaller outside diameter, as is shown at 19, to provide a space to receive filling material. Such filler material may be applied to the outside of sleeve 8 before the sleeve is telescoped within the pipe. It will be understood that when the outer shell 3 is used on pipe having inner threads, the outer shell may fit closely against the outer surface of the pipe and need not carry any filling material.

In Figs. 5 and 6 the inner shell 20 corresponds generally to shell 8 of Fig. 1, but is provided with a modified form of expanding means. This means includes, as shown, opposed wedge brackets 21, preferably welded as at 22, to the shell adjacent to the longitudinal edges thereof, and a wedge-shaped key 23. The brackets 21 have edge portions 24 which are offset radially inward of the inner surface of shell 20, to provide a space to receive key 23. The roots of the offset portions of brackets 21 are located on converging lines corresponding to the convergence of the opposed edges of key 23, so that when the key is inserted in the space between the brackets 21 and is moved longitudinally of shell 20 into seating position against the roots of the brackets, the shell will be expanded and the side edges of the key will seat for major parts of their lengths against the roots of the brackets, thereby expanding the shell for its full longitudinal length and seating positively against the brackets, and the key will be locked in place due to the fact that the edges are inclined at angles to the longitudinal center line thereof.

In Fig. 7 the shell 8 is provided with an outwardly projecting, annular or circumferentially extending portion 10a provided with a narrow surface 11a to engage and be seated in the inner surface of pipe 1. This narrow surface may be sharp and hardened and is intended to act like edge 11 of Fig. 1 in locking the protector to the pipe.

It will be understood that the separate shells of foregoing figures may be made in one piece, if desired.

In Fig. 8 the thread protector includes a single shell having an outer annular part 30 to surround the pipe end, a radial part 31 to lie against the end surface of the pipe, and an inner annular part 32 to extend within the pipe. The outer part 30 is shaped to provide a space between it and the threaded part of the pipe to receive filler 33, is tapered to conform to the taper of the pipe and has an internal end 34 to lie close to or against the unthreaded surface of the pipe. The inner part 32 has an outturned inner edge flange 35 provided with a sharp edge 36 to seat against the inner surface of the pipe. The part 32 is provided with a plurality of longitudinal slits 37, more or less uniformly spaced apart, to permit substantially uniform expansion of part 32. Split ring 38 is shaped to seat in part 32 and may be expanded by bolt 39 and may thereby expand part 32 until edge 36 engages or seats in the inner surface of the pipe.

Having thus described the present invention so that others skilled in the art may be able to understand and practice the same, we state that what we desire to secure by Letters Patent is defined in what is claimed.

What is claimed is:

1. A protector for threads on the end of a pipe comprising a cylindrical shell to encircle the end of a pipe having threads to be protected and including an in-turned flange at the outer end to overlie the end surface of a pipe, a circumferentially expansible, clindrical shell insertable within the pipe having an out-turned flange at its outer end to bear against the in-turned flange of the outer shell, and having an outwardly projecting, circumferentially coextensive portion provided with a narrow surface to engage the inner surface of the pipe, one of said shells being spaced apart from said pipe to provide a recess for thread protecting material, and means for circumferentially expanding said inner shell to force the said narrow surface into biting engagement with the inner surface of the pipe, said inner shell serving to retain the outer shell in position on the pipe during handling.

2. A protector for threads on the end of a pipe comprising a circumferentially expansible, cylindrical shell, insertable within the pipe, having an out-turned flange at its outer end, having an out-turned inner end provided with a substantially coextensive edge to engage the inner surface of the pipe beyond the threads and the wall between said ends being spaced from threads on the inside of said pipe and adapted to retain filling material in contact with said threads, and means for circumferentially expanding the said inner shell to force the said edge into biting engagement with the unthreaded inner surface of the pipe and secure the protector in place on said pipe.

3. A protector for threads on the end of a pipe comprising a circumferentially expansible, cylindrical shell, insertable within a threaded pipe and having an annular, outwardly projecting, substantially coextensive narrow surface to engage the inner unthreaded surface of the pipe, and means for circumferentially expanding said shell to force the said surface throughout substantially its entire circumferential length into biting engagement with the unthreaded inner surface of the pipe.

4. A protector for threads on the end of a pipe comprising an outer, circumferentially continuous shell to encircle a pipe and having an inturned annular flange to lie against the end surface of the pipe, an inner, cylindrical, longitudinally split, circumferentially expansible shell insertable within the pipe and having an outturned flange coextensive therewith to lie against the outer surface of said inturned flange of the outer shell, said inner shell having a narrow surface substantially coextensive circumferentially therewith to engage the smooth inner surface of the pipe, and means at the opposed ends of said inner shell to expand the shell circumferentially and to force said narrow surface into sufficiently intimate engagement with said smooth surface of the pipe to retain the shells in place during rough handling of the pipe.

JULIUS KAHN.
WALTER F. SCHULZ.
CECIL SCHOFIELD.